(12) United States Patent
Kim et al.

(10) Patent No.: US 12,482,279 B2
(45) Date of Patent: Nov. 25, 2025

(54) METHOD AND APPARATUS FOR IDENTIFYING FOOD USING MULTIMODAL MODEL

(71) Applicant: NUVI LABS CO., LTD., Incheon (KR)

(72) Inventors: Dae Hoon Kim, Seoul (KR); Jey Yoon Ru, Seoul (KR); Luca Pimenta Medeiros, Seoul (KR)

(73) Assignee: NUVI LABS CO., LTD., Incheon (KR)

(*) Notice: Subject to any disclaimer, the term of this patent is extended or adjusted under 35 U.S.C. 154(b) by 412 days.

(21) Appl. No.: 18/090,389

(22) Filed: Dec. 28, 2022

(65) Prior Publication Data

US 2024/0135734 A1 Apr. 25, 2024
US 2024/0233411 A9 Jul. 11, 2024

(30) Foreign Application Priority Data

Oct. 24, 2022 (KR) .................. 10-2022-0137688

(51) Int. Cl.
- G06V 20/68 (2022.01)
- G06V 10/26 (2022.01)
- G06V 10/764 (2022.01)
- G06V 10/774 (2022.01)
- G06F 40/20 (2020.01)

(52) U.S. Cl.
CPC .............. *G06V 20/68* (2022.01); *G06V 10/26* (2022.01); *G06V 10/764* (2022.01); *G06V 10/774* (2022.01); *G06F 40/20* (2020.01)

(58) Field of Classification Search
None
See application file for complete search history.

(56) References Cited

U.S. PATENT DOCUMENTS

2022/0261579 A1* 8/2022 Jindal .................. G06F 16/532

OTHER PUBLICATIONS

Salvador, A. et al., "Learning Cross-Modal Embeddings for Cooking Recipes and Food Images," IEEE Conference on Computer Vision and Pattern Recognition (CVPR), pp. 3068-3076 (2017).
Carvalho, M. et al., "Cross-Modal Retrieval in the Cooking Context: Learning Semantic Text-Image Embeddings," SIGIR '18: The 41st International ACM SIGIR Conference on Research & Development in Information Retrieval, pp. 35-44 (2018).
Extended European Search Report dated Apr. 8, 2024 as received in Application No. 23210761.5.

* cited by examiner

*Primary Examiner* — Leon Flores
(74) *Attorney, Agent, or Firm* — Maschoff Brennan

(57) ABSTRACT

Provided are a method and an apparatus for identifying food using a multimodal model. A method for identifying food using a multimodal model according to one embodiment of the present disclosure comprises setting a plurality of food images belonging to different classes as pre-learning targets; pre-learning a multimodal model for each of the plurality of food images set as the pre-learning target so that a text feature paired with an image feature is more similar to the image feature than the other text features not paired with the image feature; and identifying food to be identified from input food images using the pre-learned multimodal model.

14 Claims, 6 Drawing Sheets

METHOD AND APPARATUS FOR IDENTIFYING FOOD USING MULTIMODAL MODEL

CROSS-REFERENCE TO RELATED APPLICATIONS

This application claims benefit of priority to Korean Patent Application No. 10-2022-0137688 filed on 24 Oct. 2022 in the Korean Intellectual Property Office, the disclosure of which is incorporated herein by reference in its entirety.

TECHNICAL FIELD

The present disclosure relates to a method and apparatus for identifying food and, more particularly, to a method and apparatus for identifying food using artificial intelligence.

BACKGROUND ART

Recently, as more and more people want to maintain a healthy diet, such as a well-being diet, the demand for technology for identifying food and measuring the amount of food is increasing.

When the technology is used properly, even in places where meals are served to a plurality of people, such as schools, companies, military camps, government offices, and hospitals, types and amounts of food served to people may be measured, through which the amount of served and leftover food is measured. Accordingly, many advantageous effects may be obtained in that the amount of demand and supply may be predicted to realize the efficient management of food distribution, and the number of calories consumed by people may be managed.

However, since most current technologies use a food image taken through a camera for a simple image search, the search accuracy is considerably low. Moreover, since the accuracy of food type identification in the image search is low, a resulting error increases in the following steps, such as calorie counting.

On the other hand, deep learning is being applied to the image identification stage to solve the problem above, but the recent deep learning technology reveals significant problems. A typical image classification model is effective only for classifying previously learned images. In other words, the classification accuracy for a new image not learned before is lower than that obtained from the classification of images completed for pre-learning. The image classification model completed for training shows low classification performance for images seen for the first time. For example, when characteristic information of stripes required to distinguish a horse from a zebra is not learned in advance, a general image classification model is unable to distinguish a horse from a zebra.

SUMMARY

Embodiments of the present disclosure intend to provide a method and apparatus for identifying food using a multimodal model for correctly identifying a new food image that has not been previously learned through a pre-learned multimodal model.

However, the technical problem to be solved by the present disclosure is not limited to the above but may be extended to other various problems belonging to the scope not departing from the technical principles and domain of the present disclosure.

According to one embodiment of the present disclosure, a method for identifying food executed by an apparatus for identifying food comprises setting a plurality of food images belonging to different classes as pre-learning targets; pre-learning a multimodal model for each of the plurality of food images set as the pre-learning target so that a text feature paired with an image feature is more similar to the image feature than the other text features not paired with the image feature; and identifying food to be identified from input food images using the pre-learned multimodal model.

The setting the plurality of food images as pre-learning targets may assign index numbers to the plurality of food images, generate food image indexes, and set the generated food image indexes as the pre-learning targets.

The setting the plurality of food images as pre-learning targets may group the food image indexes according to the respective classes and rearrange the food image indexes in their order so that indexes of the same class are separated from each other.

The setting the plurality of food images as pre-learning targets may divide the rearranged food image indexes into batch size chunks for pre-learning so that the batch does not include the indexes of the same class.

The pre-learning a multimodal model may have a pre-configured vector operation result using a text feature paired with an image feature converge to a first specific value and have a preconfigured vector operation result using the other text features not paired with the image feature converge to a second specific value for each of the plurality of the set food images.

The identifying food to be identified may identify food to be identified from an input food image using a class list generated through the pre-learned multimodal model and a preset menu list, wherein the food may be limited to a class list generated through the preset menu list.

The method may further include detecting a food object from an input food image and cropping at least one partial food image corresponding to the detected food object, and the identifying food to be identified may identify food to be identified from the cropped, at least one partial food image using the pre-learned multimodal model.

The text paired with each of the plurality of food images may include at least one of a food name, a food menu name, a food recipe, a food ingredient, a food menu description, a food image description, and food content corresponding to each of the plurality of food images.

Meanwhile, according to another embodiment of the present disclosure, an apparatus for identifying food using a multimodal model may be provided, the apparatus comprising a database storing a plurality of food images to be pre-learned; a memory storing one or more programs; and a processor executing the one or more programs stored, wherein the processor is configured to set a plurality of food images belonging to different classes as pre-learning targets, pre-learn a multimodal model for each of the plurality of food images set as the pre-learning target so that a text feature paired with an image feature is more similar to the image feature than the other text features not paired with the image feature, and identify food to be identified from input food images using the pre-learned multimodal model.

The processor may assign index numbers to the plurality of food images, generate food image indexes, and set the generated food image indexes as the pre-learning targets.

The processor may group the food image indexes according to the respective classes and rearrange the food image indexes in their order so that indexes of the same class are separated from each other.

The processor may divide the rearranged food image indexes into batch size chunks for pre-learning so that the batch does not include the indexes of the same class.

The processor may have a preconfigured vector operation result using a text feature paired with an image feature converge to a first specific value and have a preconfigured vector operation result using the other text features not paired with the image feature converge to a second specific value for each of the plurality of the set food images.

The processor may identify food to be identified from an input food image using a class list generated through the pre-learned multimodal model and a preset menu list, wherein the food may be limited to a class list generated through the preset menu list.

The processor may detect a food object from an input food image, crop at least one partial food image corresponding to the detected food object, and identify food to be identified from the cropped, at least one partial food image using the pre-learned multimodal model.

The text paired with each of the plurality of food images may include at least one of a food name, a food menu name, a food recipe, a food ingredient, a food menu description, a food image description, and food content corresponding to each of the plurality of food images.

The present disclosure may provide the following effects. However, since it is not meant that a specific embodiment has to provide all of or only the following effects, the technical scope of the present disclosure should not be regarded as being limited by the specific embodiment.

Embodiments of the present disclosure may pre-learn a multimodal model using a plurality of food images comprising different classes used as pre-learning targets and identify an unseen food image not learned through the pre-learned multimodal model. Here, the food image to be identified may be an unseen or unknown new menu.

Embodiments of the present disclosure may identify food by learning food images and texts for the food images (e.g., food names, recipes, ingredients, and food content) together through a natural language-based multimodal model.

Embodiments of the present disclosure may classify a food image previously unknown but to be identified as virtual food through a pre-learned multimodal model.

Embodiments of the present disclosure may increase natural language understanding capability to understand the text of a food image by pre-learning food images and texts paired with the food images together.

Embodiments of the present disclosure may increase the analysis accuracy of a food image by adding at least one of a food menu name, a food menu description, and a food image description related to the food image.

Embodiments of the present disclosure may infer a previously unknown food image like a human through a pre-learned multimodal model.

DESCRIPTION OF EXEMPLARY EMBODIMENTS

Since the present disclosure may be modified in various ways and may provide various embodiments, specific embodiments will be depicted in the appended drawings and described in detail with reference to the drawings. However, it should be understood that the specific embodiments are not intended to limit the gist of the present disclosure; rather, it should be understood that the specific embodiments include all of the modifications, equivalents, or alternatives belonging to the technical principles and scope of the present disclosure. In describing the present disclosure, if it is determined that a detailed description of a related art incorporated herein unnecessarily obscure the gist of the present disclosure, the detailed description thereof will be omitted.

Terms such as "first" and "second" may be used to describe various constituting elements, but the constituting elements should not be limited by the terms. The terms are introduced to distinguish one element from the others.

The technical terms used in the present disclosure have been introduced solely for the purpose of describing a specific embodiment, and it should be noted that the terms are not intended to restrict the technical scope of the present disclosure. Terms used in the present disclosure have been selected as much as possible from general terms relevant to the functions of the present disclosure and currently in wide use; however, the selection of terms may be varied depending on the intention of those persons skilled in the corresponding field, precedents, or emergence of new technologies. Also, in a particular case, some terms may be selected arbitrarily by the applicant, and in this case, detailed definitions of the terms will be provided in the corresponding description of the present disclosure. Therefore, the terms used in the present disclosure should be defined not simply by their apparent name but based on their meaning and context throughout the present disclosure.

It should be understood that the singular expression includes the plural expression unless the context clearly indicates otherwise. In the present disclosure, the terms "comprises" or "have" specify the presence of stated features, numerals, steps, operations, components, parts, or a combination thereof, but do not preclude the presence or addition of one or more other features, numerals, steps, operations, components, parts, or a combination thereof.

In what follows, embodiments of the present disclosure will be described in detail with reference to appended drawings. Throughout the specification, the same or corresponding constituting element is assigned the same reference number, and repeated descriptions thereof will be omitted.

Figure 1:
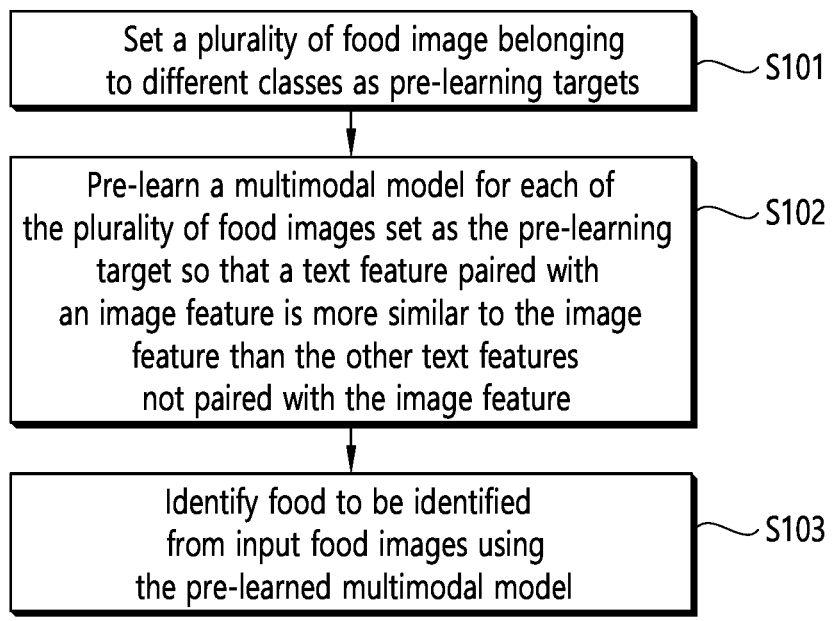
FIG. 1 illustrates a method for identifying food using a multimodal model according to one embodiment of the present disclosure.

FIG. 1 illustrates a method for identifying food using a multimodal model according to one embodiment of the present disclosure.

As shown in FIG. 1, in the S101 step, the apparatus for identifying food using a multimodal model according to one embodiment of the present disclosure sets a plurality of food images comprising different classes as target objects for pre-learning.

In the S102 step, the apparatus for identifying food pre-learns a multimodal model for each of the plurality of food images set as the pre-learning target so that a text feature paired with an image feature is more similar to the image feature than the other text features not paired with the image feature. For example, the multimodal model may include a zero-shot model learned through image and text features.

Here, that a text feature paired with an image feature is similar to the image feature means that an operation result obtained by calculation through a specific operation using an image vector representing the image feature and a text vector representing the text feature converges to a first specific value.

For example, when a text feature paired with an image feature is similar to the image feature, and an operation result converges to the first specific value, it may indicate that the cosine value of an angle formed by the image vector and the text vector converges to 0 degrees.

On the other hand, that a text feature not paired with the image feature becomes distant from the image feature as far as possible means that the calculation result through a specific operation using the image vector and the text vector converges to a second specific value.

For example, when a text feature not paired with an image feature is placed as far away from the image feature as possible, and the calculation result converges to the second specific value, it may indicate that the cosine value of an angle formed by the image vector and the text vector converges to 180 degrees.

In the example above, the cosine operation is set as the specific operation. However, the specific operation required for pre-learning a multimodal model is not limited to the cosine operation; the specific operation may include various operations such as angle operation and distance operation between an image vector and a text vector.

In the S103 step, the apparatus for identifying food identifies food to be identified from input food images using a pre-learned multimodal model.

As described above, the apparatus for identifying food using a multimodal model according to one embodiment of the present disclosure may pre-learn a multimodal model using a plurality of food images comprising different classes used as pre-learning targets and identify a food image through the pre-learned multimodal model. Here, the food image to be identified may be an unseen or unknown new menu.

The apparatus for identifying food using a multimodal model according to one embodiment of the present disclosure may identify food by learning food images and associated texts paired with the food images (e.g., food names, food recipes, food ingredients, and food content) together through a natural language-based multimodal model. Here, the text may be a caption paired with the food image. If the food in the food image is previously unknown, the apparatus for identifying food may classify the food belonging to input food images, which are previously unknown identification targets, as a virtual food through the pre-learned multimodal model.

Through the operation, the apparatus for identifying food using a multimodal model according to one embodiment of the present disclosure may increase natural language understanding capability to understand the text of a food image by pre-learning food images and texts paired with the food images together.

The apparatus for identifying food using a multimodal model according to one embodiment of the present disclosure may increase the analysis accuracy of the food image by adding at least one of a food menu name, a food menu description, and a food image description related to the food image.

The apparatus for identifying food using a multimodal model according to one embodiment of the present disclosure may infer a previously unknown food image like a human through a pre-learned multimodal model.

Figure 2:
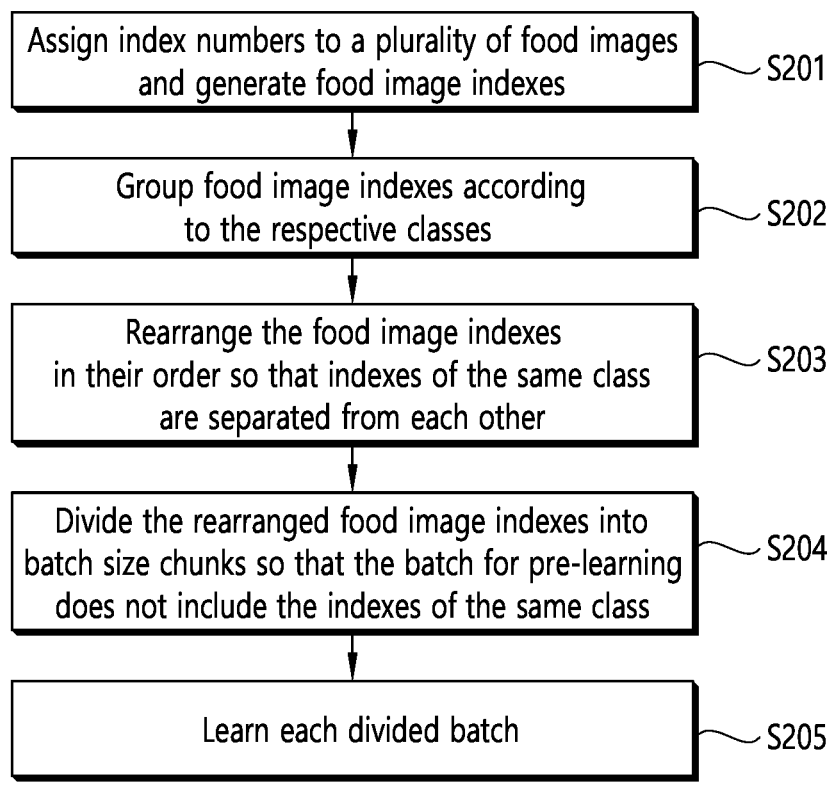
FIG. 2 illustrates a contrastive sampler algorithm in a method for identifying food using a multimodal model according to one embodiment of the present disclosure.

FIG. 2 illustrates a contrastive sampler algorithm in a method for identifying food using a multimodal model according to one embodiment of the present disclosure.

As shown in FIG. 2, in the S201 step, the apparatus for identifying food using a multimodal model according to one embodiment of the present disclosure assigns index numbers to a plurality of food images to generate food image indexes.

In the S202 step, the apparatus for identifying food groups food image indexes according to the respective classes.

In the S203 step, the apparatus for identifying food rearranges food image indexes in their order so that indexes of the same class are separated from each other.

In the S204 step, the apparatus for identifying food divides the food image indexes into batch size chunks so that a batch for pre-learning does not include the indexes of the same class. Here, the batches for pre-learning may include at least one batch according to the classes to which food image indexes are grouped or the number of food image indexes.

In the S205 step, the apparatus for identifying food learns the individual batches divided.

Meanwhile, the apparatus for identifying food using a multimodal model according to one embodiment of the present disclosure performs a batch selection operation including a sampler. The apparatus for identifying food uses a contrastive learning technique when training a multimodal model. In other words, the apparatus for identifying food learns a plurality of food images and a plurality of paired texts (e.g., captions and descriptions) in batches. At this time, the apparatus for identifying food performs learning so that the features of the text paired with one food image are set as close as possible, and the features of the text not paired with the food image are placed as far as possible.

Accordingly, the apparatus for identifying food may perform a batch selection operation so that indexes of the same class, that is, the same food type, are not included in a plurality of food images by applying multimodal model learning in the food domain. Therefore, the apparatus for identifying food performs a batch selection operation so that indexes of different classes are included in one batch from the dataset of food images input to the multimodal model as a pre-learning target.

At this time, the apparatus for identifying food performs a batch selection operation, as shown in FIG. 2, so that indexes of different classes are included in one batch.

The apparatus for identifying food performs a contrastive sampler algorithm for a dataset of food images, which is a pre-learning target of the multimodal model.

The apparatus for identifying food assigns an index number to all of the plurality of food images.

And the apparatus for identifying food groups all of the plurality of food image indexes according to the respective classes.

Then, the apparatus for identifying food rearranges all the plurality of food images in their order. The operation is intended to separate indexes of the same class to be arranged alongside the indexes of different classes.

The apparatus for identifying food divides the indexes into batch size chunks. Here, it is assumed that the batch size is smaller than the number of classes of food images.

Then, the apparatus for identifying food performs a pre-learning operation of the multimodal model for each batch obtained by dividing the indexes into the batch size.

In what follows, an example of the contrastive sampler algorithm will be described.

A class list of a plurality of food images may be expressed as "[F, A, A, B, C, B, D, F, A, D]."

The apparatus for identifying food may assign an index number "[0, 1, 2, 3, 4, 5, 6, 7, 8, 9]" to a plurality of food images "[F, A, A, B, C, B, D, F, A, D]."

The apparatus for identifying food may group a plurality of food image indexes for each class as "A: [1, 2, 8] B: [3, 5] C: [4] D: [6, 9] F: [0, 7]." Here, the indexing operation is to avoid reusing an image (e.g., A 1) used in a previous batch but to use an image (e.g., A 2) that belongs to the same class but has not been used before in the next batch.

Then, the apparatus for identifying food may rearrange the plurality of food image indexes in their order as "[A 1, B 3, C 4, D 6, F 0, A 2, B 5, D 9, F 7, A 8]." In other words, indexes of the same class A, B, D, and F included in the food images may be arranged alongside the indexes of different classes.

The apparatus for identifying food may divide the indexes into batch size chunks as "[[A 1, B 3, C 4, D 6], [F 0, A 2, B 5, D 9], [F 7, A 8] ]."

Afterward, the apparatus for identifying food may perform a pre-learning operation of the multimodal model using the individual samples divided into batch sizes, namely, "[[A 1, B 3, C 4, D 6], [F 0, A 2, B 5, D 9], [F 7, A 8]]."

Figure 3:
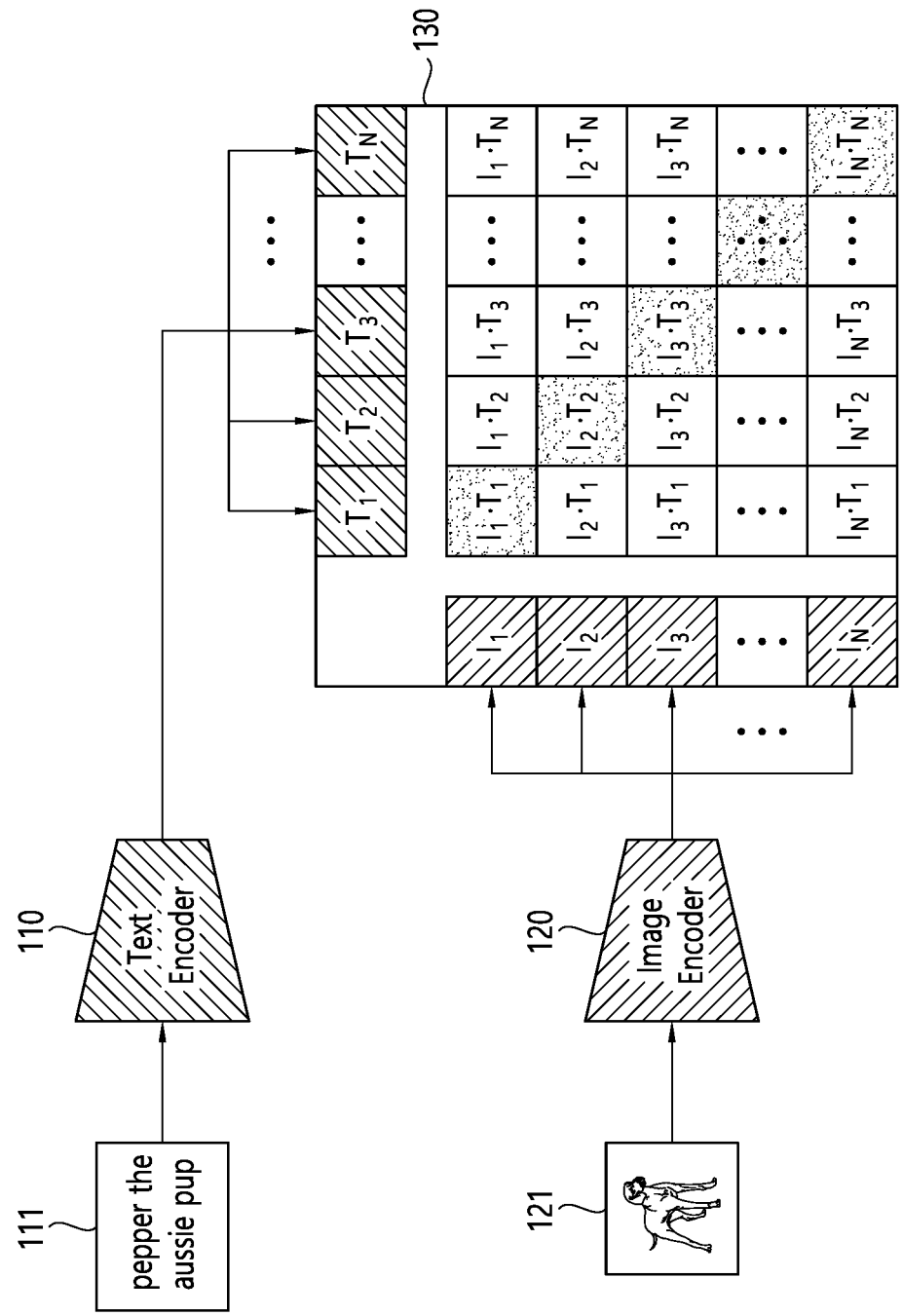
FIG. 3 illustrates a pre-learning operation of a multimodal model according to one embodiment of the present disclosure.

FIG. 3 illustrates a pre-learning operation of a multimodal model according to one embodiment of the present disclosure.

As shown in FIG. 3, the apparatus for identifying food using a multimodal model according to an embodiment of the present disclosure performs a pre-learning operation of a multimodal model. The apparatus for identifying food includes a text encoder 110, an image encoder 120, and a pre-learner 130 for the pre-learning operation of the multimodal model. According to embodiments, the text encoder 110, the image encoder 120, and the pre-learner 130 may be implemented in a processor.

In what follows, a detailed operation of a pre-learning operation of a multimodal model according to one embodiment of the present disclosure of FIG. 3 will be described.

The text encoder 110 encodes a text set used as a pre-learning target and calculates text features for each text included in the text set.

The image encoder 120 encodes a food image set used as a pre-learning target and calculates food image features for each food image included in the food image set. Here, each food image included in the food image set is paired with a corresponding text in the text set.

The pre-learner 130 combines the text features calculated by the text encoder 110 and the food image features calculated by the image encoder 120. Also, the pre-learner 130 may train the multimodal model so that a food image-text pair forming a pair is more similar than the rest of the food image-text pairs that do not form a pair.

As an example, the pre-learner 130 may generate food image-text pairs corresponding to combinations of food image feature $I_1$, $[I_1, T_1]$, $[I_1, T_2]$, $[I_1, T_3]$, . . . , $[I_1, T_{N-1}]$, $[I_1, T_N]$; food image-text pairs corresponding to combinations of food image feature $I_2$, $[I_2, T_1]$, $[I_2, T_2]$, $[I_2, T_3]$, . . . , $[I_2, T_{N-1}]$, $[I_2, T_N]$; food image-text pairs corresponding to combinations of food image feature $I_3$, $[I_3, T_1]$, $[I_3, T_2]$, $[I_3, T_3]$, . . . , $[I_3, T_{N-1}]$, $[I_3, T_N]$; and food image-text pairs corresponding to combinations of food image feature $I_N$, $[I_N, T_1]$, $[I_N, T_2]$, $[I_N, T_3]$, . . . , $[I_N, T_{N-1}]$, $[I_N, T_N]$. The pre-learner 130 may pre-learn the multimodal model so that the food image-text pairs $[I_1, T_1]$, $[I_2, T_2]$, $[I_3, T_3]$, . . . , $[I_{N-1}, T_{N-1}]$, $[I_N, T_N]$ forming a pair is more similar to each other than the rest of the food image-text pairs that do not form a pair.

Figure 4:
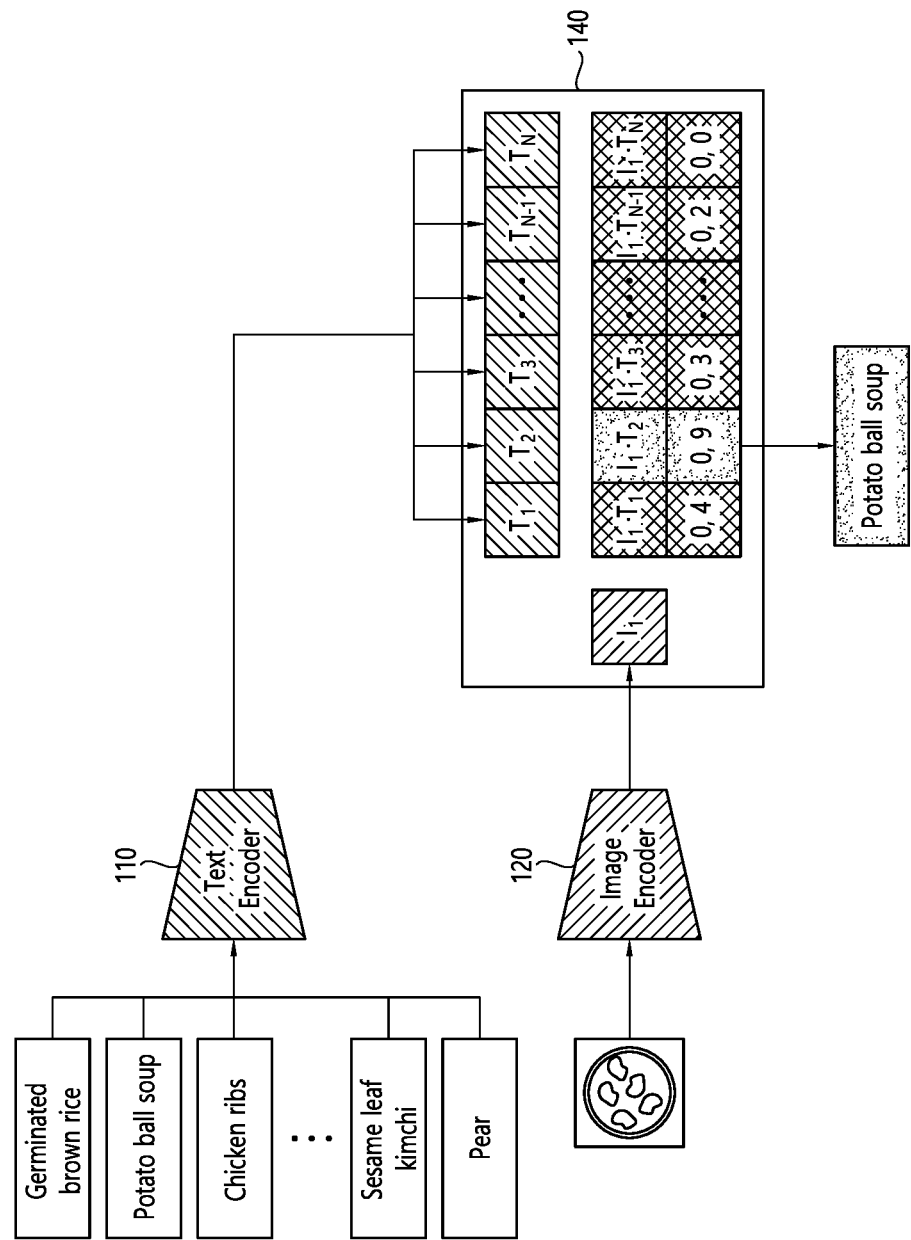
FIG. 4 illustrates an operation for identifying food to be identified according to one embodiment of the present disclosure.

FIG. 4 illustrates an operation for identifying food to be identified according to one embodiment of the present disclosure.

As shown in FIG. 4, an apparatus for identifying food using a multimodal model according to one embodiment of the present disclosure performs an operation of identifying food to be identified. The apparatus for identifying food includes a text encoder 110, an image encoder 120, and a food identifier 140 for the operation of identifying food to be identified. According to embodiments, the text encoder 110, the image encoder 120, and the food identifier 140 may be implemented in a processor.

In what follows, a specific operation of identifying food to be identified according to one embodiment of the present disclosure of FIG. 4 will be described.

The text encoder 110 encodes germinated brown rice, potato ball soup, chicken ribs, . . . , sesame leaf kimchi, and pear and extracts a text feature for each food name. For example, the text encoder 110 may calculate the text feature of each food as $T_1, T_2, T_3, \ldots T_{N-1}, T_N$.

The image encoder 120 encodes the food image of potato ball soup to calculate food image features. For example, the food image of potato ball soup may be encoded, and the food image feature may be calculated as $I_1$.

The food identifier 140 may calculate the similarity for each combination by combining the calculated food image feature and each text feature. For example, the similarity of each combination $[I_1, T_1]$, $[I_1, T_2]$, $[I_1, T_3]$, . . . , $[I_1, T_{N-1}]$, $[I_1, T_N]$ may be calculated as $[I_1, T_1]=0.4$, $[I_1, T_2]=0.9$, $[I_1, T_3]=0.3$, . . . , $[I_1, T_{N-1}]=0.2$, $[I_1, T_N]=0.6$. Here, since the combination with the highest similarity is $[I_1, T_2]=0.9$, the food identifier 140 may identify the text corresponding to the food image feature $I_1$ as potato ball soup corresponding to the text feature $T_2$. Given a food image and text, a number between 0 and 1 may express whether these two are the right pair. This number may be a probability or a similarity score. The number may be a similarity score indicating whether a pair between a food image and a text is similar.

On the other hand, the apparatus for identifying food according to one embodiment of the present disclosure may identify a food class of the food in an input food image to be identified, which is previously unseen. A typical classification model distinguishes the class of an identification target among N classes learned by the classification model. For example, when a food image for which the model has not been learned (e.g., chicken ribs) is presented, a typical classification module is unable to determine that the food image has never been learned. However, the apparatus for identifying food using a multimodal model according to one embodiment of the present disclosure may increase the probability of determining the food image as chicken ribs using a multimodal model. At this time, when the apparatus for identifying food has menu information of a restaurant or a meal menu of a cafeteria that serves food, the image of which has never been learned before, the apparatus for identifying food may identify a food image never learned before using the multimodal model and preset menu information (e.g., cafeteria menu information or restaurant menu information).

A general image classification model may classify images to be identified only through learned classes. However, the apparatus for identifying food using a multimodal model according to one embodiment of the present disclosure may classify food images of all classes by using a preset menu list together with a multimodal model in which the image encoder 120 and the text encoder 110 are combined. In other words, the apparatus for identifying food may increase the capability of classifying food images compared to the general image classification model by applying a preset menu list to the food image classification operation using a multimodal model. The apparatus for identifying food may classify food images using a multimodal model but limit the classification result of a food image to the menu size (e.g., an average of 5 classes). Since the food classification result is limited to the menu size, the possibility of food classification may be increased.

For example, even if the multimodal model does not learn about chicken ribs during pre-learning using the multimodal model, it is possible to learn about the image features of chicken ribs including food recipes and food ingredients. Once the features similar to chicken ribs are learned in this way, the apparatus for identifying food may correctly identify chicken ribs through a multimodal model limited to a preset menu list. For example, the apparatus for identifying food may calculate a cosine distance between a food image and a menu name divided into one of five classes and identify a pair yielding the closest cosine distance as the most probable class.

Figure 5:
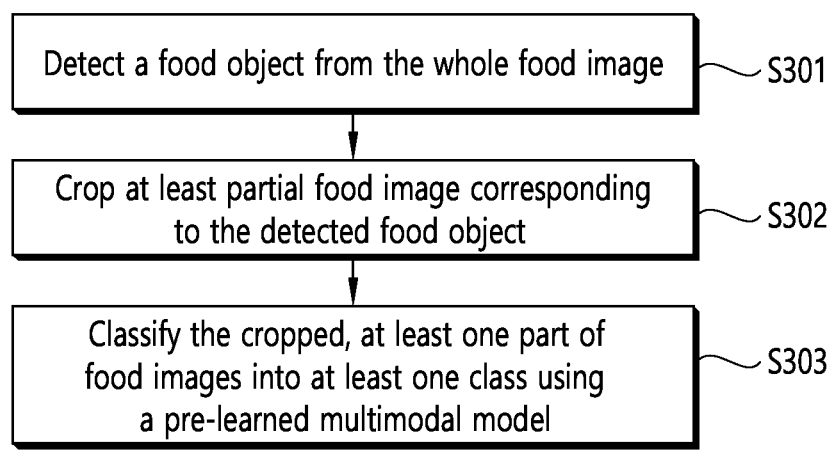
FIG. 5 illustrates an image crop operation in a method for identifying food using a multimodal model according to one embodiment of the present disclosure.

FIG. 5 illustrates an image crop operation in a method for identifying food using a multimodal model according to one embodiment of the present disclosure.

As shown in FIG. 5, in the S301 step, the apparatus for identifying food using a multimodal model according to one embodiment of the present disclosure detects food objects in the whole food image.

In the S302 step, the apparatus for identifying food crops at least one part of food images corresponding to the detected food object.

In the S303 step, the apparatus for identifying food classifies the cropped, at least one part of food images into at least one class using a pre-learned multimodal model.

In this way, the apparatus for identifying food using a multimodal model according to one embodiment of the present disclosure may identify a food image by applying a multimodal model to part of the whole food images rather than the whole food images.

A typical classification model references the original image and selects the closest description. However, the apparatus for identifying food according to one embodiment of the present disclosure may again crop part of the whole food image detected as food and apply a multimodal model to the cropped partial food image to identify the part of the food image. In other words, the typical classification model performs food image classification on all input food images.

For example, one food class is classified from one whole food image. However, the apparatus for identifying food using a multimodal model according to one embodiment of the present disclosure may identify a plurality of food classes from one whole food image including a plurality of food classes. In other words, one whole food image may be identified as having a plurality of food classes.

To this end, the apparatus for identifying food may detect food objects in the whole food image. This operation is intended to find all food instances first. Then the apparatus for identifying food may crop at least part of food images corresponding to the detected food objects. After that, the apparatus for identifying food may classify part of the cropped food images into at least one class using the pre-learned multimodal model. Here, a criterion for selecting part of food images is part of areas corresponding to the portion of food to be identified from the whole food image, and the apparatus for identifying food may crop only the part of food images.

Figure 6:
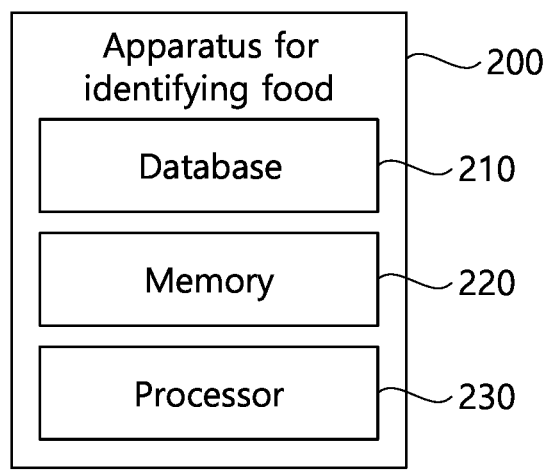
FIG. 6 illustrates a structure of an apparatus for identifying food using a multimodal model according to one embodiment of the present disclosure.

FIG. 6 illustrates a structure of an apparatus for identifying food using a multimodal model according to one embodiment of the present disclosure.

As shown in FIG. 6, the apparatus 200 for identifying food using a multimodal model according to one embodiment of the present disclosure includes a database 210, a memory 220, and a processor 230. However, not all of the constituting elements shown in the figure are essential constituting elements. The apparatus 200 for identifying food using a multimodal model according to one embodiment of the present disclosure may be implemented using a larger or smaller number of constituting elements than shown in the figure.

In what follows, a detailed structure and operation of each constituting element of the apparatus 200 for identifying food using a multimodal model according to one embodiment of the present disclosure of FIG. 6 will be described.

The database 210 stores a plurality of food images which are pre-learning targets.

The memory 220 stores one or more programs related to identification of food using a multimodal model.

The processor 230 executes one or more programs stored in the memory 220. The processor 230 sets a plurality of food images of different classes as a pre-learning target and pre-learns a multimodal model for each of the plurality of food images set as the pre-learning target so that a text feature paired with an image feature is more similar to the image feature than the other text features not paired with the image feature and identifies food to be identified from an input food image using the pre-learned multimodal model.

According to embodiments, the processor 230 may assign index numbers to the plurality of food images, generate food image indexes, and set the generated food image indexes as the pre-learning targets.

According to embodiments, the processor 230 may group the food image indexes according to the respective classes and rearrange the food image indexes in their order so that indexes of the same class are separated from each other.

According to embodiments, the processor 230 may divide the rearranged food image indexes into batch size chunks for pre-learning so that the batch does not include the indexes of the same class.

According to embodiments, the processor 230 may have a preconfigured vector operation result using a text feature paired with an image feature converge to a first specific value and have a preconfigured vector operation result using the other text features not paired with the image feature converge to a second specific value for each of the plurality of the set food images.

According to embodiments, the processor 230 may identify food to be identified from an input food image using a class list generated through the pre-learned multimodal model and a preset menu list, wherein the food may be limited to a class list generated through the preset menu list.

According to embodiments, the processor 230 may detect a food object from an input food image, crop at least one partial food image corresponding to the detected food object, identify food to be identified from the cropped, at least one partial food image using the pre-learned multimodal model.

According to embodiments, the text paired with each of the plurality of food images may include at least one of a food name, a food recipe, a food ingredient, and food content paired with each of the plurality of food images.

Meanwhile, when the processor executes a method, a non-transitory computer-readable storage medium may be provided for storing instructions used by the processor to execute the method, the method comprising setting a plurality of food images belonging to different classes as pre-learning targets; pre-learning a multimodal model for each of the plurality of food images set as the pre-learning target so that a text feature paired with an image feature is more similar to the image feature than the other text features not paired with the image feature; and identifying food to be identified from input food images using the pre-learned multimodal model.

Meanwhile, according to one embodiment of the present disclosure, various embodiments described above may be implemented by software including instructions stored in a machine (e.g., a computer) readable storage media. The machine is an apparatus capable of calling stored instructions from the storage medium and operating according to the instructions called, which may include an electronic device (for example, an electronic device (A)) according to the disclosed embodiments. When an instruction is executed by the processor, the processor may perform the function corresponding to the instruction directly or by using other constituting elements under the control of the processor. The instruction may include code generated or executed by a compiler or an interpreter. The machine-readable storage medium may be provided in the form of a non-transitory storage medium. Here, the term 'non-transitory' only indicates that the storage medium does not include a signal and is tangible but does not distinguish whether data are stored semi-permanently or temporarily.

Also, according to one embodiment of the present disclosure, the method according to various embodiments described above may be provided by being included in a computer program product. The computer program product may be traded between sellers and buyers as a commodity. The computer program product may be distributed in the form of a machine-readable storage medium (for example, a Compact Disc Read Only Memory (CD-ROM)) or online through an application store (for example, Play Store™). In the case of online distribution, at least part of the computer program product may be at least stored temporarily or generated temporarily in a server of the manufacturer, a server of the application store, or a storage medium such as a memory of a relay server.

Also, according to one embodiment of the present disclosure, various embodiments described above may be implemented in a recording medium that may be read by a computer or a machine similar thereto by using software, hardware, or a combination of both. In some cases, the embodiments of the present disclosure may be implemented within a processor itself. In the case of software implementation, the embodiments such as procedures and functions according to the present disclosure may be implemented by separate software modules. Each of the software modules may perform one or more functions and operations according to the present disclosure.

Meanwhile, the computer instructions for executing processing operations of the machine according to various embodiments described above may be stored in a non-transitory computer-readable medium. When executed by a processor of a specific machine, the computer instructions stored in the non-transitory computer-readable medium instruction the specific machine to perform processing operations for an apparatus according to the various embodiments described above. The non-transitory computer-readable medium refers to a medium that stores data semi-permanently and that may be read by a machine, rather than a medium that stores data for a short time period such as a register, a cache, and a memory. Specific examples of the non-transitory computer-readable medium include a CD, a DVD, a hard disk, a Bluray disk, a USB memory, a memory card, and a ROM.

Also, each of the constituting elements (for example, a module or a program) according to the various embodiments of the present disclosure may be composed of a single or multiple entities; and part of the corresponding sub-elements described above may be omitted, or another sub-element may be further included in the various embodiments. Alternatively or additionally, part of the constituting elements (for example, a module or a program) may be integrated into a single entity, and the functions executed by the respective constituting elements prior to the integration may be performed in the same manner or in a similar manner. The operations executed by a module, a program, or another constituting element according to the various embodiments may be performed in a sequential, parallel, or heuristic manner; or at least part of the operations may be performed in a different order or omitted, or another operation may be added to the operations.

Throughout the document, preferred embodiments of the present disclosure have been described with reference to appended drawings; however, the present disclosure is not limited to the embodiments above. Rather, it should be noted that various modifications of the present disclosure may be made by those skilled in the art to which the present disclosure belongs without leaving the technical scope of the present disclosure defined by the appended claims, and these modifications should not be understood individually from the technical principles or perspectives of the present disclosure.

What is claimed is:

1. A method for identifying food executed by an apparatus for identifying food, the method comprising:
    setting a plurality of food images belonging to different classes as pre-learning targets;
    pre-learning a multimodal model for each of the plurality of food images set as the pre-learning target so that a text feature paired with an image feature is more similar to the image feature than the other text features not paired with the image feature; and
    identifying food to be identified from input food images using the pre-learned multimodal model,
    wherein the setting the plurality of food images as pre-learning targets groups the food image indexes generated by assigning index numbers to the plurality of food images according to the respective classes and rearranges the food image indexes in their order so that indexes of the same class are separated from each other.

2. The method of claim 1, wherein the setting the plurality of food images as pre-learning targets assigns index numbers to the plurality of food images, generates food image indexes, and sets the generated food image indexes as the pre-learning targets.

3. The method of claim 1, wherein the setting the plurality of food images as pre-learning targets divides the rearranged food image indexes into batch size chunks for pre-learning so that the batch does not include the indexes of the same class.

4. The method of claim 1, wherein the pre-learning a multimodal model has a preconfigured vector operation result using a text feature paired with an image feature converge to a first specific value and has a preconfigured vector operation result using the other text features not paired with the image feature converge to a second specific value for each of the plurality of the set food images.

5. The method of claim 1, wherein the identifying food to be identified identifies food to be identified from an input food image using a class list generated through the pre-learned multimodal model and a preset menu list, wherein the food is limited to a class list generated through the preset menu list.

6. The method of claim 1, further including:
  detecting a food object from an input food image; and
  cropping at least one partial food image corresponding to the detected food object, and
  the identifying food to be identified identifies food to be identified from the cropped, at least one partial food image using the pre-learned multimodal model.

7. The method of claim 1, wherein the text paired with each of the plurality of food images includes at least one of a food name, a food menu name, a food recipe, a food ingredient, a food menu description, a food image description, and food content corresponding to each of the plurality of food images.

8. An apparatus for identifying food using a multimodal model comprising:
  a database storing a plurality of food images to be pre-learned;
  a memory storing one or more programs; and
  a processor executing the one or more programs stored, wherein the processor is configured to:
    set a plurality of food images belonging to different classes as pre-learning targets,
    pre-learn a multimodal model for each of the plurality of food images set as the pre-learning target so that a text feature paired with an image feature is more similar to the image feature than the other text features not paired with the image feature, and
    identify food to be identified from input food images using the pre-learned multimodal model,
  wherein the processor groups the food image indexes generated by assigning index numbers to the plurality of food images according to the respective classes and rearrange the food image indexes in their order so that indexes of the same class are separated from each other.

9. The apparatus of claim 8, wherein the processor assigns index numbers to the plurality of food images, generate food image indexes, and sets the generated food image indexes as the pre-learning targets.

10. The apparatus of claim 8, wherein the processor divides the rearranged food image indexes into batch size chunks for pre-learning so that the batch does not include the indexes of the same class.

11. The apparatus of claim 8, wherein the processor has a preconfigured vector operation result using a text feature paired with an image feature converge to a first specific value and has a preconfigured vector operation result using the other text features not paired with the image feature converge to a second specific value for each of the plurality of the set food images.

12. The apparatus of claim 8, wherein the processor identifies food to be identified from an input food image using a class list generated through the pre-learned multimodal model and a preset menu list, wherein the food is limited to a class list generated through the preset menu list.

13. The apparatus of claim 8, wherein the processor detects a food object from an input food image, crops at least one partial food image corresponding to the detected food object, and identifies food to be identified from the cropped, at least one partial food image using the pre-learned multimodal model.

14. The apparatus of claim 8, wherein the text paired with each of the plurality of food images includes at least one of a food name, a food menu name, a food recipe, a food ingredient, a food menu description, a food image description, and food content corresponding to each of the plurality of food images.

* * * * *